United States Patent
Rommer et al.

(10) Patent No.: US 12,490,176 B2
(45) Date of Patent: *Dec. 2, 2025

(54) HANDLING A UE THAT IS IN THE IDLE STATE

(71) Applicant: Telefonaktiebolaget LM Ericsson (publ), Stockholm (SE)

(72) Inventors: Stefan Rommer, Västra Frölunda (SE); Qian Chen, Mölndal (SE); Daniel Nilsson, Älvängen (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,759

(22) Filed: Jan. 9, 2024

(65) Prior Publication Data

US 2024/0224166 A1 Jul. 4, 2024

Related U.S. Application Data

(63) Continuation of application No. 17/545,069, filed on Dec. 8, 2021, now Pat. No. 11,889,405, which is a
(Continued)

(51) Int. Cl.
*H04W 72/04* (2023.01)
*H04W 8/08* (2009.01)
(Continued)

(52) U.S. Cl.
CPC ............. *H04W 48/16* (2013.01); *H04W 8/08* (2013.01); *H04W 68/005* (2013.01); *H04W 76/25* (2018.02); *H04W 80/10* (2013.01)

(58) Field of Classification Search
CPC ..... H04W 48/16; H04W 8/08; H04W 68/005; H04W 76/25; H04W 80/10; H04W 68/00;
(Continued)

(56) References Cited

U.S. PATENT DOCUMENTS

| 11,202,249 B2 | 12/2021 | Rommer | |
|---|---|---|---|
| 2019/0394711 A1* | 12/2019 | Kim | H04W 76/25 |
| 2020/0059989 A1* | 2/2020 | Velev | H04W 8/08 |

FOREIGN PATENT DOCUMENTS

KR 10-2009-0053207 5/2009

OTHER PUBLICATIONS

Qualcomm (S2-171305, 23.502: Procedures for roaming support for non-3GPP access support, Feb. 13-17, 2017, Dubrovnik, Croatia). (Year: 2017).*

(Continued)

*Primary Examiner* — Maharishi V Khirodhar
(74) *Attorney, Agent, or Firm* — Rothwell, Figg, Ernst & Manbeck, P.C.

(57) ABSTRACT

A method performed by an AMF. The method includes receiving a first request to establish UP for a UE's PDU session and, in response to receiving the request to establish UP for the UE's PDU session, determining whether a condition is satisfied. Determining whether the condition is satisfied comprises determining if the UE is in the idle state with respect to a non-3GPP access, wherein the condition is not satisfied if the UE is not in the idle state with respect to the non-3GPP access. The method also includes initiating paging of the UE by a 3GPP access as a result of determining that the condition is satisfied.

14 Claims, 9 Drawing Sheets

Related U.S. Application Data continuation of application No. 16/493,656, filed as application No. PCT/EP2018/056552 on Mar. 15, 2018, now Pat. No. 11,202,249.

(60) Provisional application No. 62/471,434, filed on Mar. 15, 2017.

(51) Int. Cl.
| | | |
|---|---|---|
| *H04W 48/16* | (2009.01) | |
| *H04W 68/00* | (2009.01) | |
| *H04W 76/00* | (2018.01) | |
| *H04W 76/25* | (2018.01) | |
| *H04W 80/10* | (2009.01) | |
| *H04W 88/08* | (2009.01) | |

(58) Field of Classification Search
CPC ..... H04W 88/02; H04W 76/10; H04W 76/12; H04W 88/14
USPC .......................................................... 370/329
See application file for complete search history.

(56) References Cited

OTHER PUBLICATIONS

3GPP (TS 23.502 V0.2.0, 3rd Generation Partnership Project; Technical Specification Group Services and System Aspects; Procedures for the 5G System; Stage 2, release 15) (Year: 2017).*

International Search Report and Written Opinion dated Sep. 19, 2018 issued in International Application No. PCT/EP2018/056552. (18 pages).

3GPP TS 23.501 V0.3.1 (Mar. 2017); 3rd Generation Partnership Project; Technical Specification Group Services and System Aspects; System Architecture for the 5G System; Stage 2 (Release 15); (Mar. 2017). (97 pages).

3GPP TS 23.502 V0.2.0 (Feb. 2017); 3rd Generation Partnership Project; Technical Specification Group Services and System Aspects; Procedures for the 5G System; Stage 2; (Release 15); (Feb. 2017). (71 pages).

* cited by examiner

HANDLING A UE THAT IS IN THE IDLE STATE

CROSS-REFERENCE TO RELATED APPLICATIONS

This application is a continuation of U.S. application Ser. No. 17/545,069, filed on 2021 Dec. 8 (now U.S. Pat. No. 11,889,405, issued on 2024 Jan. 30), which is a continuation of U.S. application Ser. No. 16/493,656, filed on 2019 Sep. 12 (now U.S. Pat. No. 11,202,249, issued on 2012 Dec. 14), which is the U.S. National Stage of International Patent Application No. PCT/EP2018/056552, filed 2018 Mar. 15, which claims priority to U.S. provisional application No. 62/471,434, filed on 2017 Mar. 15. The above identified applications are incorporated by this reference.

TECHNICAL FIELD

Disclosed are embodiments related to handling a user equipment (UE) that is in an idle state with respect to at least one access type (e.g., 3GPP access or non-3GPP access).

BACKGROUND

As part of the $5^{th}$ generation (5G) work in the $3^{rd}$ Generation Partnership Project (3GPP), it has been agreed to create an "access agnostic" 5G core network (5G CN) 100 (see FIG. 1) that can be used to support both a 3GPP access network 202 ("3GPP access") and non-3GPP access network 204 ("non-3GPP access) (see FIG. 2) using a common set of interfaces between the access network and the 5G CN. This architecture is illustrated in FIG. 1, where the "(R)AN" node 104 indicates that the access network that a UE 102 uses to access 5G CN 100 may be 3GPP access 202 (e.g., a radio access network (RAN)) or non-3GPP access 204 (e.g., a fixed network or other non-3GPP access network). The interfaces between (R)AN 104 and the 5G CN 100 consists of a control plane interface (N2) and a user plane interface (N3).

As shown in FIG. 1, the 5G CN 100 includes an Access and Mobility Management Function (AMF) 106, which is the entity that handles access control and mobility. An AMF is allocated to a UE 102 when the UE 102 attaches via the 5G (R)AN network to 5G CN. The selection of such an AMF is based on operator policies in conjunction with input from the UE. It has been agreed in 3GPP that when the UE is connected to the 5G CN via a non-3GPP access 204, the AMF 106 is used to handle access control and mobility. Furthermore, if the UE connects to 3GPP access and non-3GPP access in the same PLMN, a common AMF is used for the UE for both 3GPP access and non-3GPP access. The non-roaming architecture is illustrated in FIG. 2 (from draft 3GPP TS 23.501). As seen in the figure, AMF 106 is used for the UE's connection over 3GPP access 202 and non-3GPP access 204.

The UE may have two separate N1 (Non-Access Stratum (NAS)) connections: one over 3GPP access and another over non-3GPP access. The N1 connections, however, may share a common security context as well as a common temporary UE Identity.

In phase 1 of the 5G work in 3GPP it has been agreed to support so called "untrusted non-3GPP" accesses. In this case Internet Key Exchange (IKE) and IP Security (IPSec) is used between the UE and a Non-3GPP Interworking Function (N3IWF) over the non-3GPP access. The N3IWF then acts as "(R)AN" towards the 5G CN and supports, for example, the N2 and N3 reference points.

For 3GPP access, there are two Connection Management (CM) states; CM-IDLE and CM-CONNECTED. A UE in CM-IDLE state has no NAS signaling connection established with the AMF over N1 and there is no UE context in RAN.

SUMMARY

It is agreed in principle that the same CM state model will apply also for non-3GPP access, and that the UE will have separate CM states in 3GPP access and non-3GPP access. It is currently discussed in 3GPP how CM-IDLE can be supported also when non-3GPP access is used. One aspect that is clear is that paging of the UE over non-3GPP access will not work when UE is in CM-IDLE state for non-3GPP access. This causes a problem since the UE will not be reachable from the network over non-3GPP access after the UE has entered CM-IDLE state, even if the UE remains within non-3GPP access coverage. Therefore, it is not possible, for example, to activate the user plane (e.g., a tunnel over N3) towards non-3GPP when a down-link data (or signaling) arrives, even if the UE is still within non-3GPP coverage.

In a scenario where the UE is in CM-IDLE state in non-3GPP access, and within coverage of both non-3GPP and 3GPP access, it is still possible to reach the UE over 3GPP access even if the UE is CM-IDLE in 3GPP access.

The different embodiments below apply to the case where the 5G CN receives down-link data traffic for a protocol data unit (PDU) Session that has no active user plane (UP) connection (i.e. no N3 tunnel established) (or wants to send signaling to the UE) but the UE is in CM-IDLE for the access last used for the PDU session:

| CM-state 3GPP | CM-state Non-3GPP | Proposed embodiments |
|---|---|---|
| IDLE | IDLE | Embodiment 1: The 5 G CN page the UE over 3 GPP access. The page message shall contain an indication that UE should make the following Service Request (SR) over non-3 GPP access. When the UE receives such page message, indicating non-3 GPP access, the UE will perform a Service Request procedure over non-3 GPP access. If the UE determines that non-3 GPP access is not available (e.g. because the UE moved out of coverage) the UE will instead do SR in 3 GPP access. |
| CONN. | IDLE | Embodiment 2.1: AMF sends NAS "RAT based service notification" message which includes the RAT info, and may also include PDU session ID info which triggered the MT traffic. Embodiment 3.1: AMF initiates handover to 3 GPP access. This is done toward the UE by creating new RAN DRBs for the PDU session. This capability/behavior (i.e. AMF initiates UP setup at the other RAT) may be synched between UE and AMF during registration or per PDU session at PDU session creation time. |
| IDLE | CONN. | Embodiment 2.2: AMF sends the NAS "RAT based service notification" message through non-3 GPP access to UE, instead of paging procedure at 3 GPP side. Embodiment 3.2: AMF initiates handover to non-3 GPP access. This is done toward the UE by creating a new IPsec child SA for the PDU session. This capability/behavior (i.e. AMF initiates UP setup at the other RAT) may be synched between UE and AMF during registration or per PDU session at PDU session creation time. |

The above embodiments allow usage of non-3GPP access or 3GPP access in case of down-link data (or signaling) on a PDU session arrives after the UE has entered CM-IDLE state for the access last used by the PDU session.

BRIEF DESCRIPTION OF THE DRAWINGS

The accompanying drawings, which are incorporated herein and form part of the specification, illustrate various embodiments.

DETAILED DESCRIPTION

As used herein a UE is a device capable of communication with an access network (e.g., a radio access network, a fixed access network, etc.), such as, for example: a smartphone, an Internet-of-Things (IOT) device (e.g., an appliance connected to the Internet), a tablet, a computer (e.g., laptop or desktop computer), a phablet, a video gaming device, a network-connected home entertainment device (e.g., a network-connected TV, a network-connected video streaming device, etc.), or any other device capable of communicating with an access network.

Figure 1:
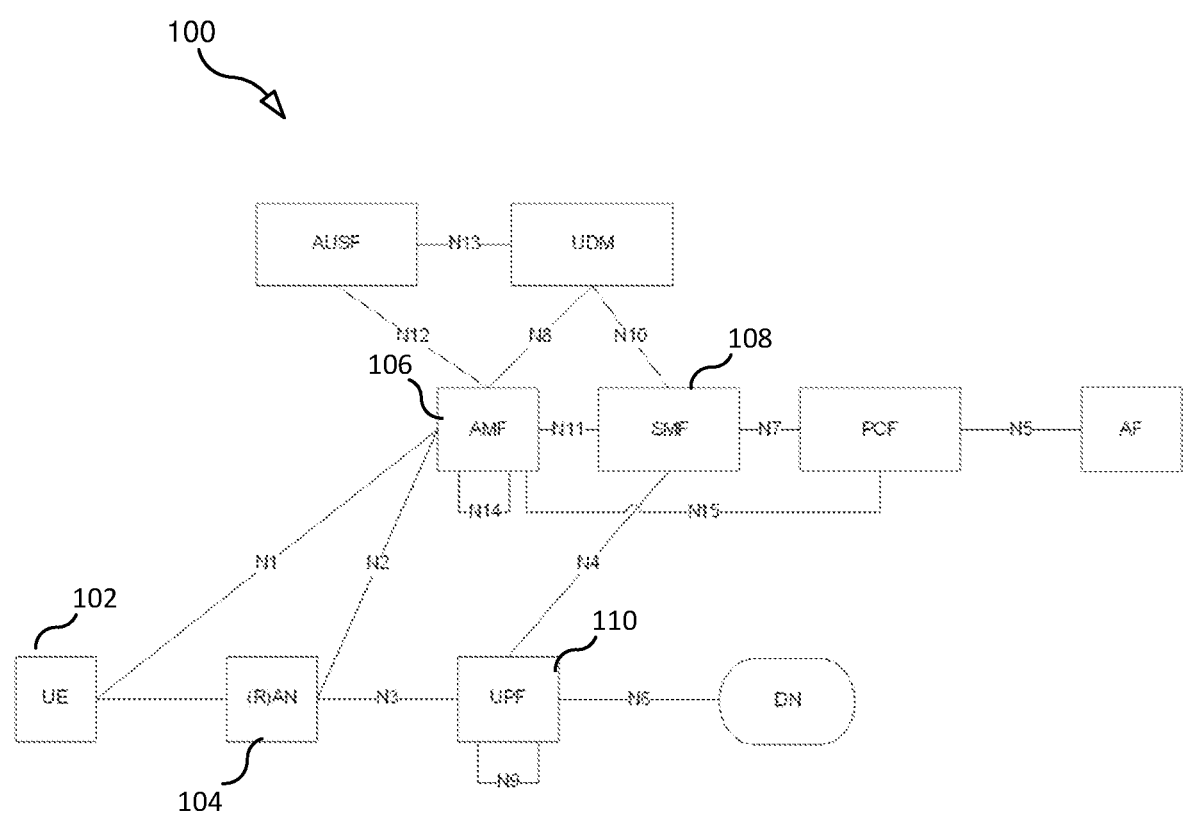
FIG. 1 illustrates an architecture view for next generation networks, according to some embodiments.
Figure 2:
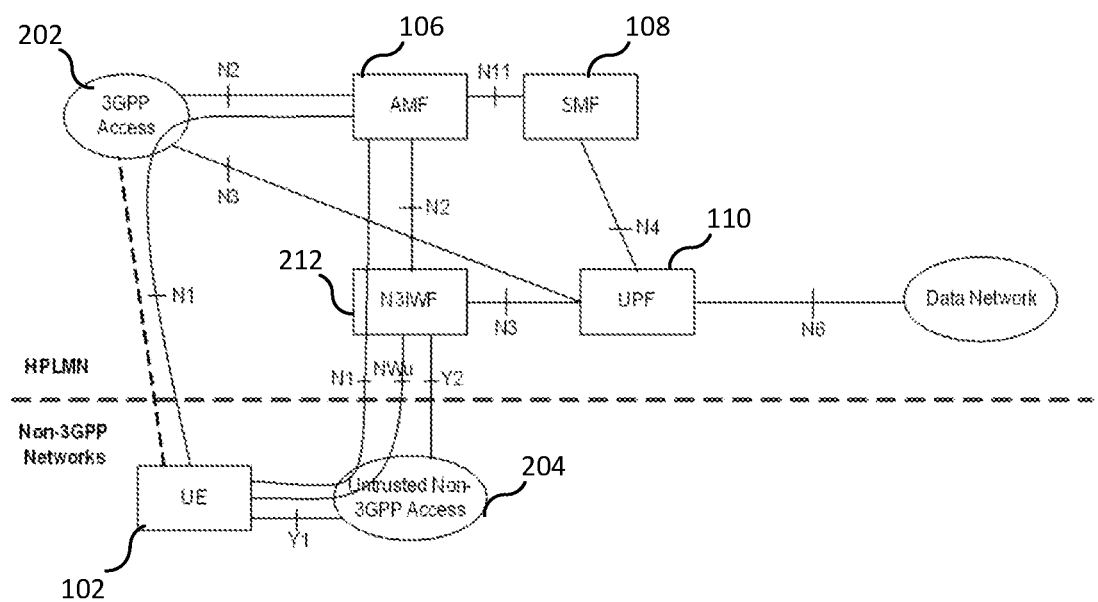
FIG. 2 illustrates a non-roaming architecture.
Figure 3:
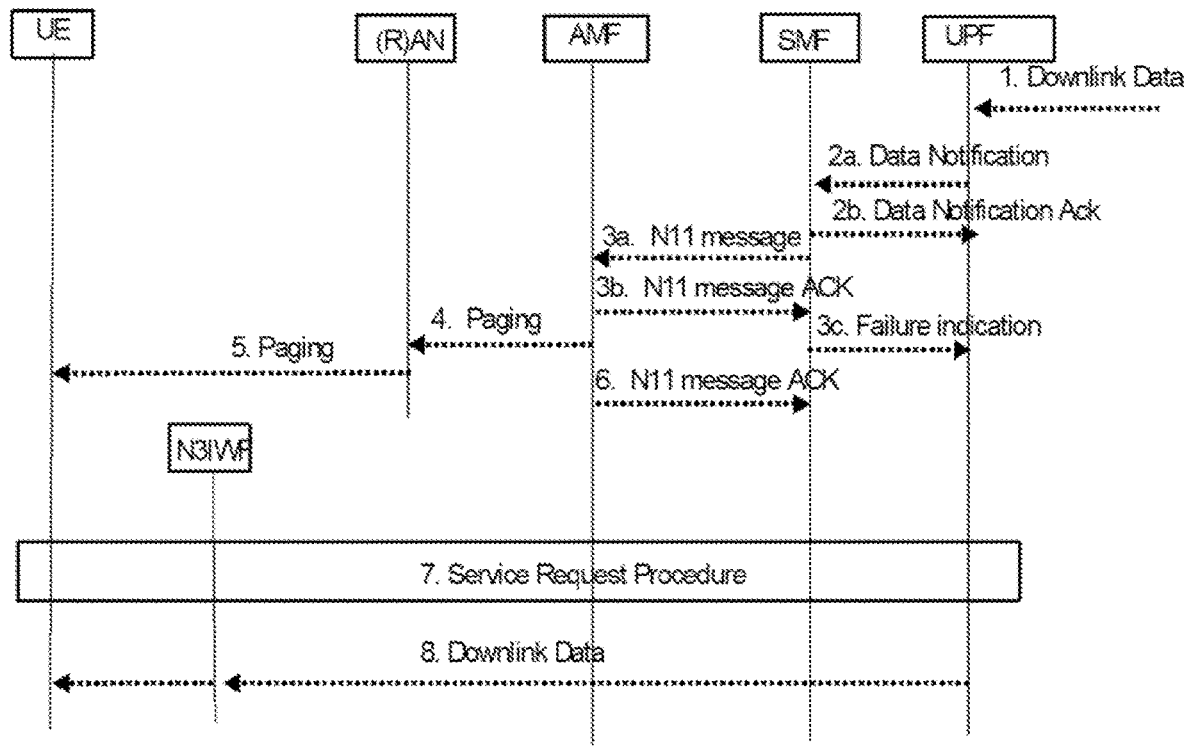
FIG. 3 is a message flow diagram illustrating an exchange of messages according to an embodiment.

FIG. 3 is a message flow diagram illustrating the first embodiment (embodiment 1) in which UE 102 is in the idle state in 3GPP and non-3GPP access.

Step 1: The User Plane Function (UPF) receives down-link data on a PDU session for the UE 102.

Step 2: The UPF buffers the data and notifies the Session Management Function (SMF) that the UPF has received down-link data for UE 102 on the PDU session.

Step 3: The SMF sends a request to AMF 106 to establish user plane (N3) for the PDU Session. The request may contain information indicating a "preferred access type" where the user plane (UP) should be established (e.g., information indicating one of: 3GPP access or non-3GPP access). This could for example be implemented as an extension of the "CN domain" parameter in the S1 paging request.

Step 4: the AMF requests the 3GPP RAN to page the UE. The request includes information indicating the preferred access type that was indicated in the request received from the SMF. The information indicating the "preferred access type" may be a single bit indicating non-3GPP access.

Step 5: The 3GPP RAN pages the UE. The page message includes information indicating the "preferred access type" (e.g. a single bit indicating non-3GPP access).

Step 6: AMF replies to SMF.

Step 7: The UE performs the Service Request procedure. More specifically, the UE initiates the service request (SR) procedure using the preferred access type indicated in step 5. For example, if the page message indicated that non-3GPP access is the preferred access type, then the UE initiates the SR procedure over non-3GPP access. In case non-3GPP access is not available (e.g. in case the UE moved out of non-3GPP coverage), the UE initiates SR in 3GPP access.

Figure 4:
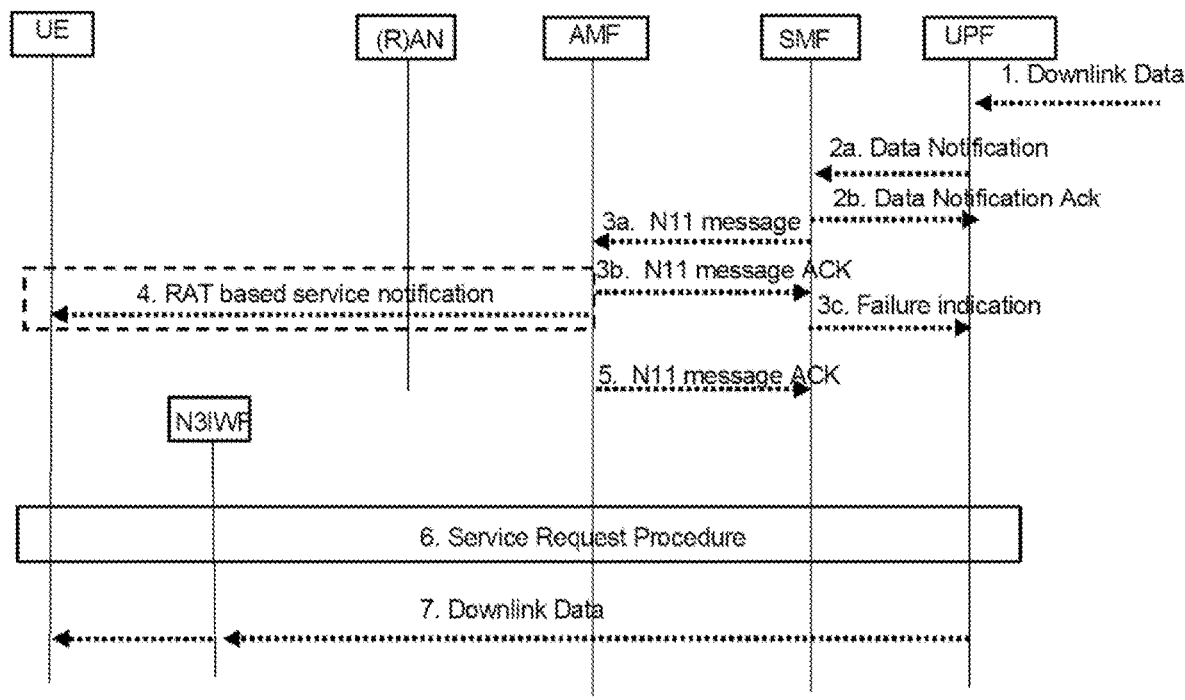
FIG. 4 is a message flow diagram illustrating an exchange of messages according to an embodiment.

FIG. 4 is a message flow diagram illustrating embodiments 2.1 and 3.1 in which UE 102 is in the idle state in one of the accesses and is in a connected state in the other access (e.g., idle in 3GPP access and connected in non-3GPP access).

Step 1: The UPF receives down-link data on a PDU session for the UE 102.

Step 2: The UPF buffers the data and notifies SMF that it has received data for the UE.

Step 3: The SMF sends a request to AMF to establish user plane (N3) for the PDU Session. The request may contain information indicating a "preferred access type" where the UP should be established (e.g., information indicating one of: 3GPP access or non-3GPP access).

Step 4: the AMF send to the UE a NAS message (e.g. a "Service notification") containing information indicating the preferred access type (3GPP/non-3GPP) and/or PDU session ID, to inform UE that it shall make a service request on the indicated access type or for that PDU session.

Step 5: AMF replies to SMF.

Step 6: The UE performs the Service Request procedure. More specifically, the UE initiates the SR procedure in the access indicated in step 4. For example, if the NAS message indicated that non-3GPP access is the preferred access type, then the UE initiates the SR procedure over non-3GPP access. The UE shall also include the PDU session IDs if it's received in step 4. In case the indicated access in step 4 is not available (e.g. in case the UE moved out of non-3GPP coverage), the UE initiates SR in other access.

Figure 5:
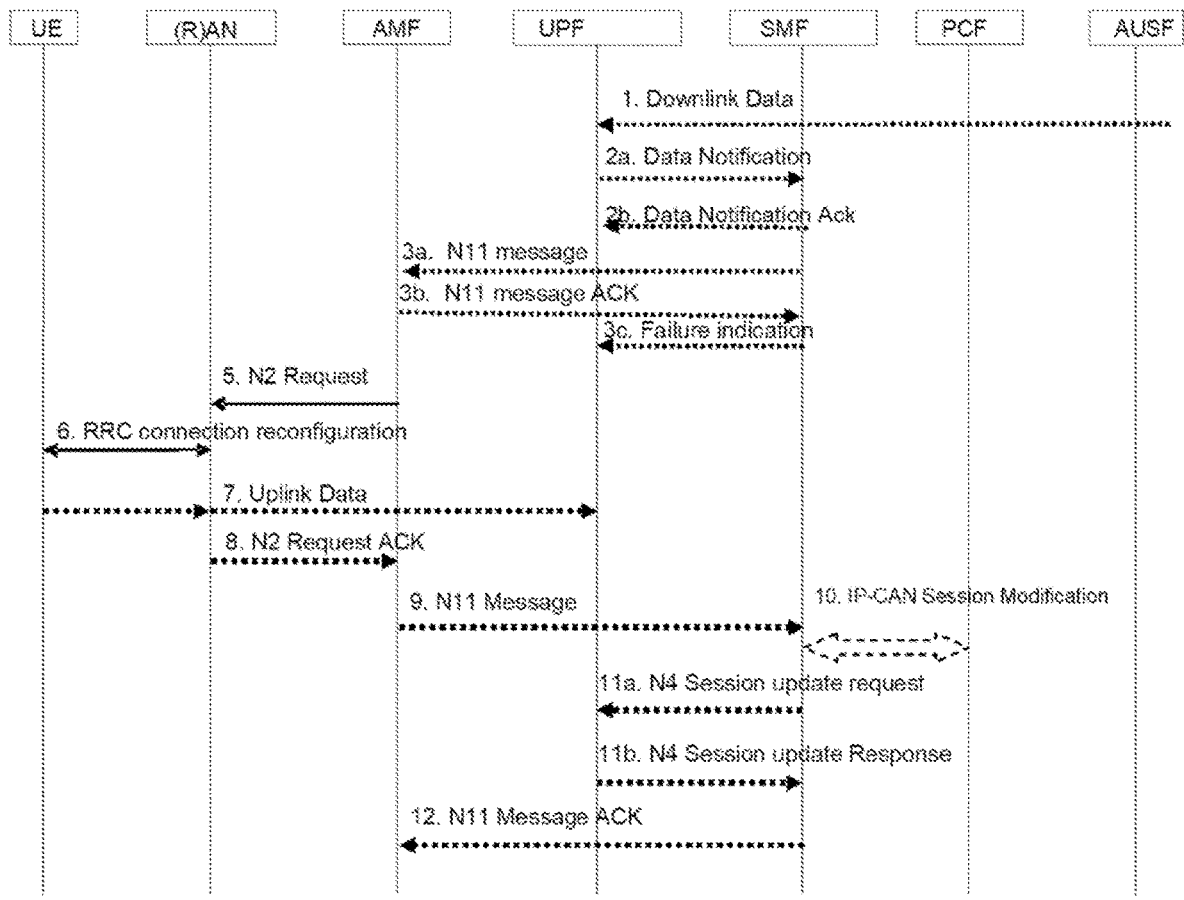
FIG. 5 is a message flow diagram illustrating an exchange of messages according to an embodiment.

FIG. 5 is a message flow diagram illustrating embodiment 3.1 in which UE 102 is in the idle state in non-3GPP access and in connected state in 3GPP access.

Step 1: The UPF receives down-link data on a PDU session for the UE.

Step 2: The UPF buffers the data and notifies SMF that it has received down-link data for the UE.

Step 3: The SMF sends a request to AMF to establish user plane (N3) for this PDU Session. The request may contain information indicating a "preferred access type" where the UP should be established (e.g., information indicating one of: 3GPP access or non-3GPP access).

Step 4: (not shown) This step in 4.2.3.4 (paging request to RAN) in 23.502 is omitted since UE is already in connected state.

Step 5: AMF to sends to (R)AN an N2 Request for UP setup (e.g., a request comprising N2 SM information received from SMF, security context, AMF Signaling Connection ID, Handover Restriction List, MM NAS Service Accept as described in 3GPP TS 23.502 v0.2.0 at section 4.2.3.2 step 5). In this case the RAN is a 3GPP radio access network node (e.g., a 3GPP base station). The N2 request may contain a "handover indicator" telling the (R)AN that the PDU session with downlink data waiting is handed over to 3GPP access. The handover indication is not needed in case this capability/behavior has been negotiated at registration or when PDU session was created.

Step 6: (R)AN to UE: The RAN performs RRC Connection Reconfiguration for the data radio bearers (DRBs) of the PDU session. The RRC Connection Reconfiguration request may contain a "handover indicator" telling the UE that the PDU session with downlink data waiting is handed over to 3GPP access. The handover indication is not needed in case this capability/behavior has been negotiated at registration or when PDU session was created.

Steps 7-12 See section 4.2.3.2 in 3GPP TS 23.502 v0.2.0.

Figure 6:
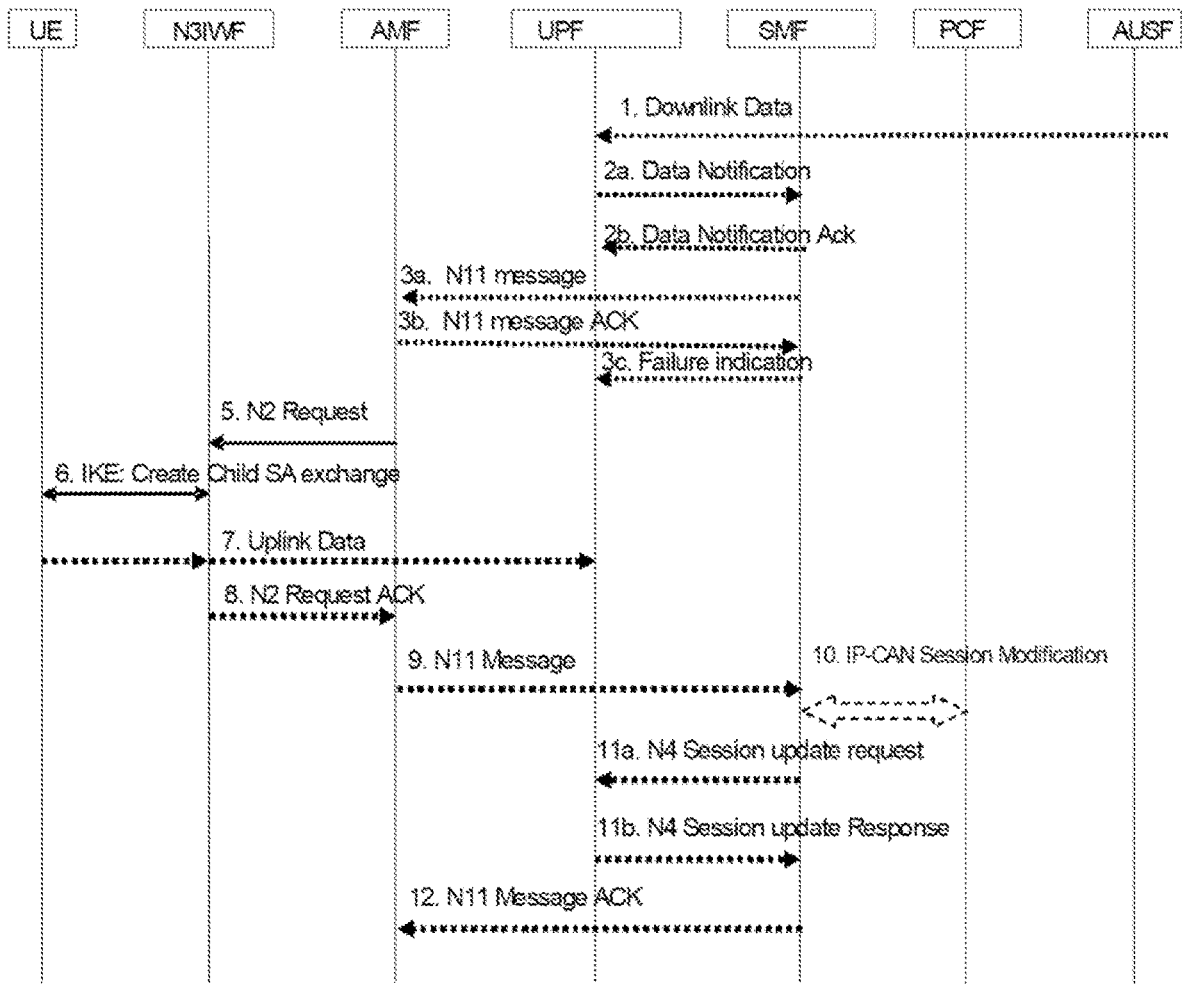
FIG. 6 is a message flow diagram illustrating an exchange of messages according to an embodiment.

FIG. 6 is a message flow diagram illustrating embodiment 3.2 in which UE 102 is in the idle state in 3GPP access and in connected state in non-3GPP access.

Step 1: The UPF receives down-link data on a PDU session for the UE.

Step 2: The UPF buffers the data and notifies SMF that it has down-link data for the UE.

Step 3: The SMF sends a request to AMF to establish user plane (N3) for this PDU Session. The request may contain information indicating a "preferred access type" where the UP should be established (e.g., information indicating one of: 3GPP access or non-3GPP access).

Step 4: (not shown) This step in 4.2.3.4 (paging request to RAN) in 3GPP TS 23.502 is omitted since UE is already in connected state.

Step 5: AMF to (R)AN: N2 Request. In this case, the RAN is the N3IWF 212. The request may contain a "handover indicator" telling the N3IWF that the PDU session with downlink data waiting is handed over to non-3GPP access. The handover indication is not needed in case this capability/behavior has been negotiated at registration or when PDU session was created.

Step 6: (R)AN to UE: The N3IWF executes IKEv2 Create Child SA exchanges to setup one or multiple IPsec SAs for the UP of the PDU session (the Create_Child_SA exchange is defined in RFC 7296). A CREATE_CHILD_SA request sent in step 6 by (R)AN to UE may contain a "handover indicator" telling the UE that the PDU session with downlink data waiting is handed over to non-3GPP access. The handover indication is not needed in case this capability/behavior has been negotiated at registration or when PDU session was created.

Steps 7-12 See section 4.2.3.2 in 3GPP TS 23.502.

Figure 7:
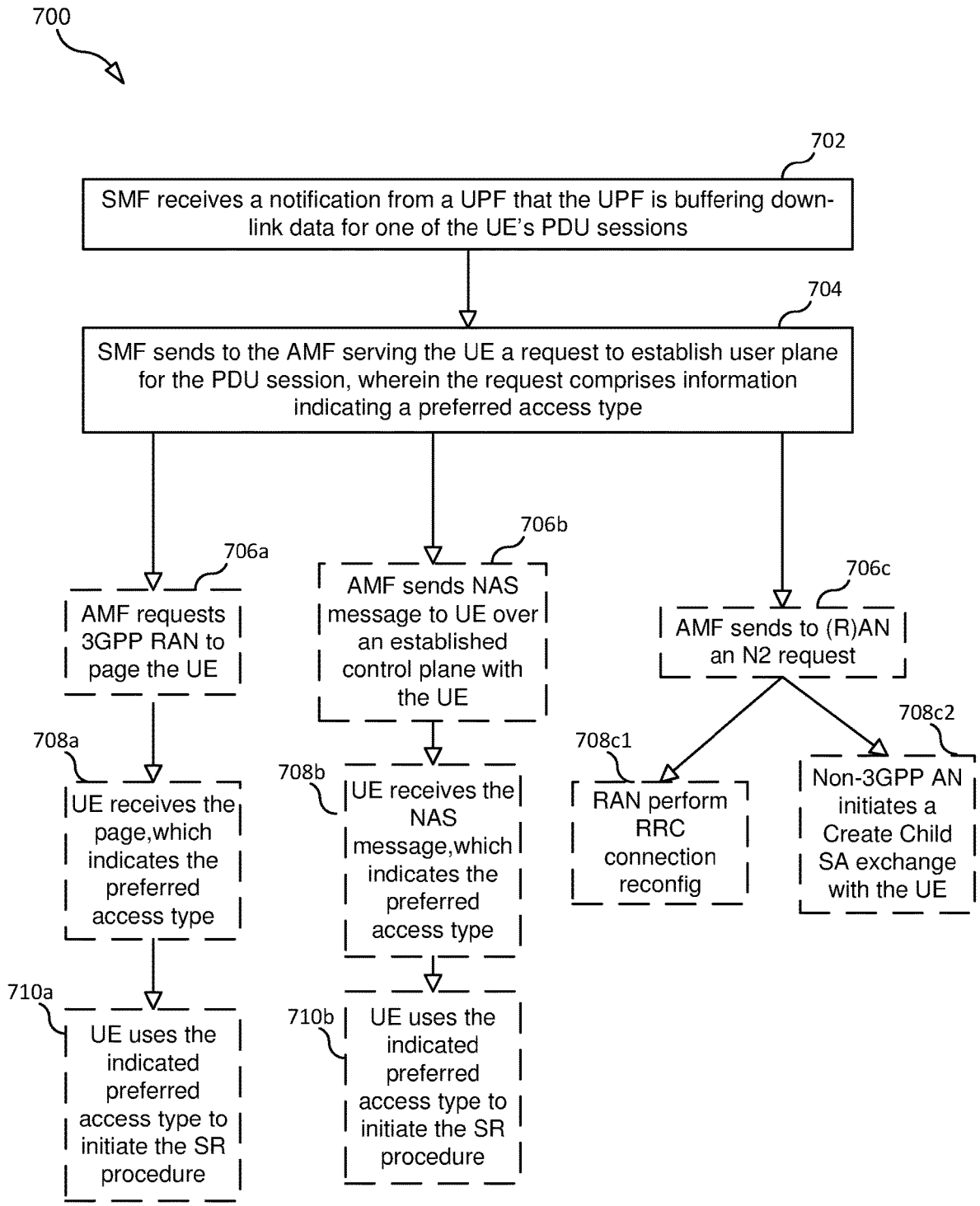
FIG. 7 is a flow chart illustrating a process according to some embodiments.

FIG. 7 is a flowchart illustrating a process 700, according to some embodiments. Process 700 may begin in step 702, in which SMF 108 receives from UPF 110 a notification that the UPF 110 is buffering down-link data for one of the UE's PDU sessions.

In step 704, the SMF, in response to the notification send by the UPF, sends to the AMF serving the UE a request to establish user plane (N3) for the PDU session, wherein the request comprises information indicating a preferred access type.

Next, the AMF, in response to the request from the SMF, performs one of steps 706a, 706b, and 706c. More specifically, AMF performs step 706a as a result of the AMF determining that the UE is idle state with respect to both the 3GPP access and the non-3GPP access, otherwise the AMF performs one of steps 706b and 706c.

In step 706a, the AMF initiates paging of the UE by the 3GPP access. For example, in step 706a, the AMF transmits to a RAN node (e.g., a base station) a request to page the UE. The page request transmitted by the AMF in step 706a comprises information indicating the preferred access type that was signaled to the AMF by the SMF in the request transmitted in step 704.

In step 708a, the RAN node, in response to receiving the page request transmitted by the AMF, transmits a page message to the UE on a paging channel (i.e., the RAN pages the UE) and the UE receives the page message. The page message is configured to trigger the UE to make a Service Request (SR). For example, when the preferred access type for the PDU session is non-3GPP access, the page message may contain an indication that the UE should make a SR over non-3GPP access.

In step 710a, the UE, in response to receiving the page message indicating non-3GPP access, performs a Service Request procedure over non-3GPP access, provided that the UE first determines that non-3GPP access is available. If the UE determines that non-3GPP access is not available (e.g. because the UE moved out of coverage) the UE will instead do SR in 3GPP access.

In some embodiments, when AMF determines that the UE is in a connected state with respect to either the 3GPP access or the non-3GPP access and in an idle state otherwise, the AMF performs step 706b.

In step 706b, the AMF transmits towards the UE a NAS "service notification" message which includes access technology (e.g., 3GPP/non-3GPP) information as described above. The NAS message may also include a PDU session ID identifying the PDU session that is associated with the down-link data that triggered the UPF to send the notification received by the SMF in step 702. If the AMF determines that the UE is in a connected state with respect to the non-3GPP access and in an idle state with respect to the 3GPP access, then the AMF will send the NAS message to the UE through the non-3GPP access (e.g., through the N3IWF 212). If, however, the AMF determines that the UE is in a connected state with respect to the 3GPP access and in an idle state with respect to the non-3GPP access, then the AMF will send the NAS message to the UE through the 3GPP access (e.g., through a 5G base station (gNB)).

In step 708b, the UE receives the NAS message, which indicates the preferred access type and optionally PDU session id.

In step 710b, the UE uses the indicated preferred access type and optionally PDU session id to initiate the SR procedure.

In other embodiments, when AMF determines that the UE is in a connected state with respect to either the 3GPP access or the non-3GPP access and in an idle state in the other access, the AMF performs step 706c.

In step 706c, the AMF sends to the (R)AN a N2 request. If the N2 request is sent to a 3GPP RAN node (e.g., a 3GPP base station), then the N2 request may contain a "handover indicator" telling the RAN node that the PDU session with downlink data waiting is handed over to 3GPP access. If the N2 request is sent to the N3IWF, the request may contain a "handover indicator" telling the N3IWF that the PDU session with downlink data waiting is handed over to non-3GPP access. In either case, the handover indication is not needed in case this capability/behavior has been negotiated at registration or when PDU session was created. When the N2 request is sent to the RAN node, the RAN node may send to the UE an RRC Connection Reconfiguration message (step 708c1). And when the N2 request is sent to N3IWF, the N3IWF performs one or more Create Child SA exchanges with the UE (step 708c2).

Figure 8:
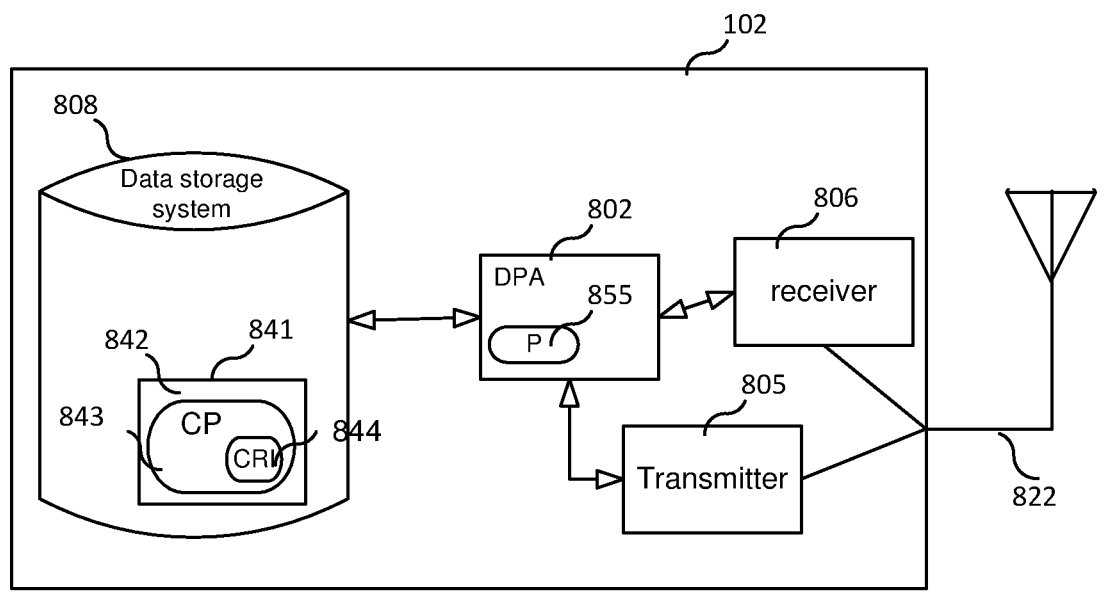
FIG. 8 is a block diagram of a UE according to some embodiments.

FIG. 8 is a block diagram of UE 102 according to some embodiments. As shown in FIG. 8, UE 102 may comprise: a data processing apparatus (DPA) 802, which may include one or more processors (P) 855 (e.g., a general purpose microprocessor and/or one or more other processors, such as an application specific integrated circuit (ASIC), field-programmable gate arrays (FPGAs), and the like); a transmitter 805 and a receiver 806 coupled to an antenna 822 for enabling UE 102 to transmit data to and receive data from an AN node (e.g., base station); and local storage unit (a.k.a., "data storage system") 808, which may include one or more non-volatile storage devices and/or one or more volatile storage devices (e.g., random access memory (RAM)). In embodiments where UE 102 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media, memory devices (e.g., random access memory), and the like. In some embodiments, the CRI 844 of computer program 843 is configured such that when executed by data processing apparatus 802, the CRI causes UE 102 to perform steps described herein (e.g., steps described herein with reference to the flow charts). In other embodiments, UE 102 may be configured to perform steps described herein without the need for code. That is, for example, data processing apparatus 802 may consist merely of one or more ASICs. Hence, the features of the embodiments described herein may be implemented in hardware and/or software.

Figure 9:
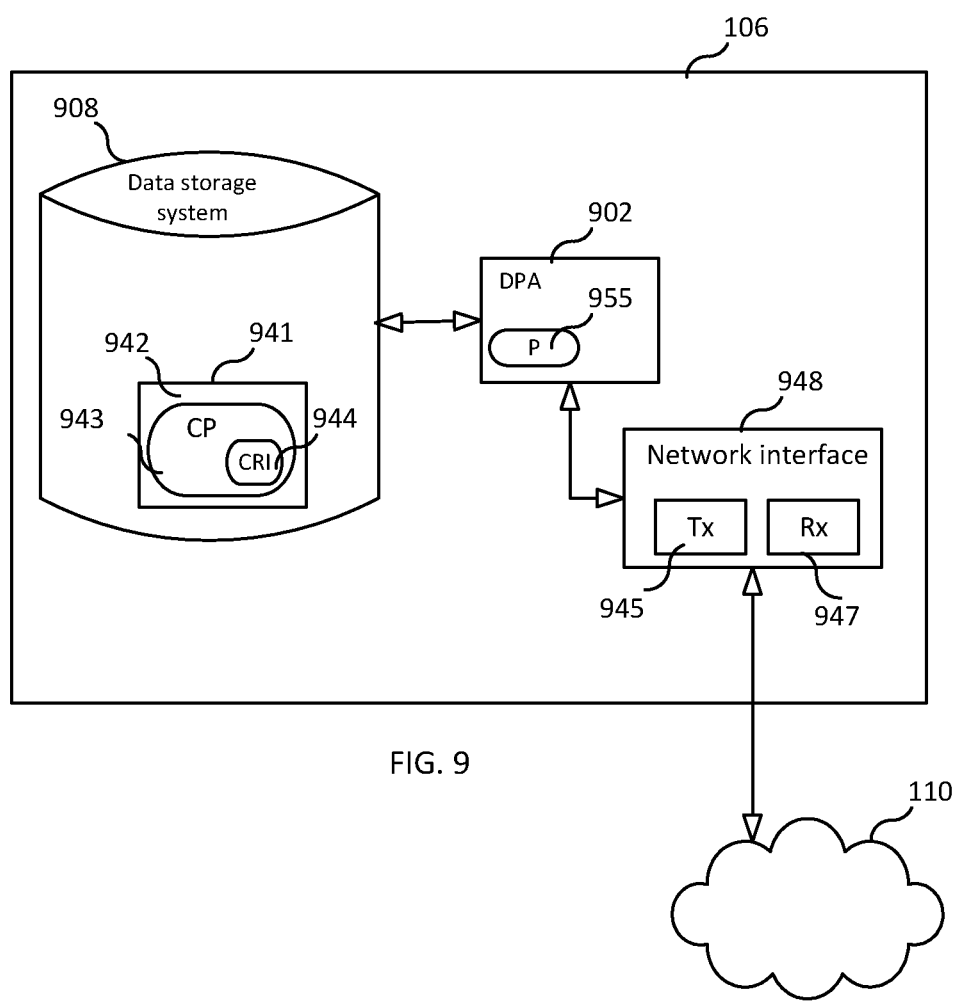
FIG. 9 is a block diagram of an AMF/SMF according to some embodiments.

FIG. 9 is a block diagram of AMF/SMF 106/108 according to some embodiments. As shown in FIG. 9, AMF/SMF may comprise: a data processing apparatus (DPA) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling AMF/SMF to transmit data to and receive data from other nodes connected to a network 110 (e.g., an Internet Protocol (IP) network) to which network interface 948 is connected; and local storage unit (a.k.a., "data storage system") 908, which may include one or more non-volatile storage devices and/or one or more volatile storage devices (e.g., random access memory (RAM)). In embodiments where AMF/SMF includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory), and the like. In some embodiments, the CRI 944 of computer program 943 is configured such that when executed by data processing apparatus 902, the CRI causes AMF/SMF to perform steps described herein (e.g., steps described herein with reference to the flow charts). In other embodiments, AMF/SMF may be configured to perform steps described herein without the need for code. That is, for example, data processing apparatus 902 may consist merely of one or more ASICs. Hence, the features of the embodiments described herein may be implemented in hardware and/or software.

Concise Description of Various Above Described Embodiments

A1a. A method, the method comprising: an SMF (108) receiving from a UPF (110) a notification that the UPF is buffering down-link data for a UE's PDU sessions; and the SMF, in response to the notification sent by the UPF, sending to an AMF (106) serving the UE, a request to establish user plane, UP, for the PDU session, wherein the request comprises information indicating a preferred access type.

A1b. A method, the method comprising: an AMF (106) receiving from an SMF (108) a request to establish user plane, UP, for a UE's PDU session, wherein the request comprises information indicating a preferred access type.

A2. The method of embodiment A1a or A1b, wherein, in response to the request from the SMF, the AMF performs a process comprising: determining that the UE is in the idle state with respect to both a 3GPP access and a non-3GPP access; and as a result of determining that the UE is in the idle state with respect to both a 3GPP access and a non-3GPP access, the AMF initiates paging of the UE by the 3GPP access (e.g., the AMF transmits to a RAN node (e.g., base station) a request to page the UE).

A3. The method of embodiment A2, wherein the page request transmitted by the AMF comprises information indicating the preferred access type that was signaled to the AMF by the SMF in the request to establish the UP.

A4. The method of embodiment A2, wherein the RAN node, in response to receiving the page request transmitted by the AMF, transmits a page message to the UE on a paging channel.

A5. The method of embodiment A4, wherein the page message is configured to trigger the UE to make a Service Request (SR) over non-3GPP access (e.g., the page message contains an indication that the UE should make a Service Request (SR) over non-3GPP access).

A6. The method of embodiment A5, wherein the UE, in response to receiving the page message indicating non-3GPP access, performs a Service Request procedure over non-3GPP access, provided that the UE first determines that non-3GPP access is available.

A7. The method of embodiment A1a or A1b, wherein, in response to the request from the SMF, the AMF performs a process comprising: determining that the UE is in a connected state with respect to either the 3GPP access or the non-3GPP access and in an idle state otherwise, and as a result of determining that the UE is in a connected state with respect to either the 3GPP access or the non-3GPP access and in an idle state otherwise, the AMF transmits towards the UE a NAS "RAT based service notification" message which includes radio access technology (RAT) information.

A8. The method of embodiment A7, wherein the NAS message further include a PDU session ID identifying the PDU session that is associated with the down-link data that triggered the UPF to send the notification received by the SMF.

A9. The method of embodiment A1a or A1b, wherein, in response to the request from the SMF, the AMF performs a process comprising: determining that the UE is in a connected state with respect to either the 3GPP access or the non-3GPP access and in an idle state otherwise, and as a result of determining that the UE is in a connected state with respect to either the 3GPP access or the non-3GPP access and in an idle state otherwise, the AMF transmits to the (R)AN a N2 request.

A10. The method of embodiment A9, wherein the N2 request is sent to a 3GPP radio access network node (e.g., a 3GPP base station), and the N2 request contain a "handover indicator" telling the RAN that the PDU session with downlink data waiting is handed over to 3GPP access.

A11. The method of claim A10, wherein the 3GPP radio access network, in response to the N2 message, transmits to the UE a RRC Connection Reconfiguration message.

A12. The method of embodiment A9, wherein the N2 request is sent to a N3IWF, and the N3IWF initiates a Create Child SA exchange with the UE after receiving the N2 message.

B1. An SMF, the SMF being configured to: receive from a UPF (110) a notification that the UPF is buffering downlink data for a UE's PDU sessions; and in response to the notification sent by the UPF, send to an AMF (106) serving the UE, a request to establish user plane, UP, for the PDU session, wherein the request comprises information indicating a preferred access type.

C1. An SMF (108), the SMF comprising: a receiving module operable to receive from a UPF (110) a notification that the UPF is buffering down-link data for a UE's PDU sessions; and a sending module configured such that, in response to the notification sent by the UPF, the sending module employs a transmitter to send to an AMF (106) serving the UE, a request to establish user plane, UP, for the PDU session, wherein the request comprises information indicating a preferred access type.

D1. An AMF, the AMF being configured to perform any one of embodiments A1b to A12.

E1. A method performed by a UE, the method comprising: receiving a page message, wherein the page message is configured to trigger the UE to make a Service Request (SR) over non-3GPP access; and the UE, in response to receiving the page message, performing a Service Request procedure over non-3GPP access if non-3GPP access is available.

E2. The method of embodiment E1, wherein the page message comprises an indicator indicating a preferred access type.

E3. The method of embodiment E2, wherein the indicator is set to "non-3GPP access."

D1. A UE, the UE being configured to: receive a page message transmitted by a 3GPP RAN node, wherein the page message is configured to trigger the UE to make a Service Request (SR) over a non-3GPP access; and in response to receiving the page message, perform a Service Request procedure (e.g., transmit a Service Request) over non-3GPP access if non-3GPP access is available.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by an access and mobility management function (AMF), the method comprising:
   receiving a first request to establish user plane (UP) for a user equipment's (UE's) protocol data unit (PDU) session;
   in response to receiving the request to establish UP for the UE's PDU session, the AMF determining whether a condition is satisfied, wherein determining whether the condition is satisfied comprises determining whether or not the UE is in the idle state with respect to a non-3GPP access, wherein the condition is not satisfied when the UE is not in the idle state with respect to the non-3GPP access; and
   as a result of determining that the condition is satisfied, initiating paging of the UE by a 3GPP access.

2. The method of claim 1, wherein
   determining whether the condition is satisfied further comprises determining whether or not UE is in the idle state with respect to a 3GPP access, wherein the condition is not satisfied when the UE is not in the idle state with respect to the 3GPP access.

3. The method of claim 2, wherein
   initiating paging of the UE by a 3GPP access comprises the AMF transmitting a page request to a radio access network (RAN) node, and
   the page request transmitted by the AMF comprises information indicating a preferred access type that was signaled to the AMF in the request to establish the UP.

4. The method of claim 3, wherein
   the page request is configured to trigger the RAN node to send a page message to the UE, and
   the page message is configured to trigger the UE to make a Service Request over non-3GPP access.

5. The method of claim 1, wherein the method further comprises:
   receiving a second request to establish UP for a second UE's protocol data unit (PDU) session;
   in response to the second request, determining whether the second UE is in a connected state with respect to either the 3GPP access or the non-3GPP access and in an idle state; and
   as a result of determining that the second UE is in a connected state with respect to either the 3GPP access or the non-3GPP access and in an idle state otherwise, the AMF transmits towards the second UE a Non-Access Stratum (NAS) notification message which includes Radio Access Technology (RAT) information.

6. The method of claim 5, wherein the NAS message further include a PDU session ID identifying the PDU session that is associated with the down-link data that triggered a user plane function (UPF) to send the notification received by the SMF.

7. The method of claim 1, wherein the method further comprises:
   receiving a second request to establish UP for a second UE's protocol data unit (PDU) session;
   in response to the second request, determining whether the UE is in a connected state with respect to either the 3GPP access or the non-3GPP access and in an idle state otherwise, and
   as a result of determining that the second UE is in a connected state with respect to either the 3GPP access or the non-3GPP access and in an idle state otherwise, the AMF transmits to the radio access network (RAN) a N2 request.

8. The method of claim 7, wherein
   the N2 request is sent to a 3GPP radio access network node, and
   the N2 request contain a handover indicator indicating the RAN that the PDU session with downlink data waiting is handed over to 3GPP access.

9. The method of claim 8, wherein
   the N2 request is sent to a N3IWF, and
   the N3IWF initiates a Create Child SA exchange with the second UE after receiving the N2 message.

10. An access and mobility management function (AMF), the AMF being configured to perform the method of claim 1.

11. The AMF of claim 10, wherein the condition is satisfied when the UE is in the idle state with respect to both the non-3GPP access and the 3GPP access.

12. A method performed by a user equipment (UE), the method comprising:
- the UE receiving a page message, wherein the page message is configured to trigger the UE to make a service request (SR) over non-3GPP access and the page message comprises a preferred access type indicator indicating a preferred access type;
- after receiving the page message, the UE determining whether the preferred access type indicator indicates non-3GPP access;
- the UE determining that non-3GPP access is not available; and
- in response to the page message, the UE performing a Service Request procedure over 3GPP access after determining that non-3GPP access is not available.

13. The method of claim 12, wherein the indicator is set to "non-3GPP access".

14. A user equipment (UE), the UE being configured to perform the method of claim 12.

\* \* \* \* \*